Figure 1:
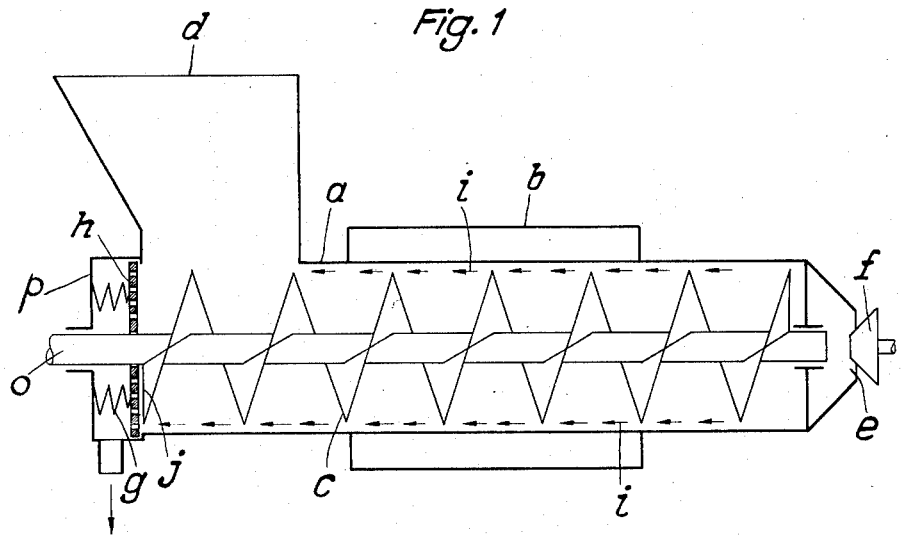

May 28, 1957  W. ROTHE ET AL  2,793,582
CONTINUOUSLY OPERATING COOKERS
Filed Oct. 26, 1954

Inventors
WALTER ROTHE
FRANZ SCHRODER
CARL WILDHAGEN

May 28, 1957 W. ROTHE ET AL 2,793,582
CONTINUOUSLY OPERATING COOKERS
Filed Oct. 26, 1954 2 Sheets-Sheet 2

Inventors
WALTER ROTHE
FRANZ SCHRODER
CARL WILDHAGEN
By John B. Brady
ATTORNEY

United States Patent Office 2,793,582
Patented May 28, 1957

2,793,582
CONTINUOUSLY OPERATING COOKERS

Walter Rothe, Hamburg, Franz Schröder, Rinteln (Weser), and Carl Wildhagen, Braunschweig-Wendhausen, Germany, assignors to Braunschweigische Maschinenbauanstalt A. G.

Application October 26, 1954, Serial No. 464,856

Claims priority, application Germany November 2, 1953

1 Claim. (Cl. 99—443)

This invention relates to a continuously operating cooker having one or more screw or worm conveyors adapted to advance the foodstuffs to be cooked through the cooker which comprises an elongated hollow body in which the screw conveyors are rotatably mounted, the cooker being intended for the cooking of foodstuffs containing juices, such as fish.

Such a cooker usually comprises a cylindrical body the walls of which form the heating surface, and one or more screw conveyors which convey the foodstuffs to be cooked through the cooker as it is fed into same, the foodstuffs being heated and cooked by the heat radiated from the walls of said cooker and being discharged continuously at one end in a suitably disintegrated state.

Experience has shown, however, that in such a cooker the total quantity of heat required for the cooking process cannot be transmitted from the regions of the body serving as heating surfaces, without carbonization of the foodstuffs being cooked occurring during the process, unless the overall dimensions of the cooker are increased to an uneconomical degree. In order, therefore, to obviate the undesirable necessity of increasing the dimensions of the heating surfaces, which in themselves are of limited capacity, additional steam, which is the cooking medium, must be introduced into the cooker to ensure satisfactory cooking of the foodstuffs. The desired effect is not obtained by increasing the capacity of the heating surfaces through increase in temperature, since, obviously, such a measure will lead to carbonization of the foodstuffs due to evaporation of the moisture contained in those regions of the material foodstuffs adjacent the heating surfaces of the cooker.

By employing direct application of steam to the foodstuffs however, the disadvantage arises that the moisture content of the foodstuffs resulting from condensation of the steam increases, which may lead to an unsatisfactory saturation of the foodstuffs.

The object of the present invention is to obviate or mitigate these disadvantages and to provide an improved cooker. The invention is a continuously-operating cooker comprising an elongated hollow body having in the region of one of its ends inlet means for feeding thereinto of uncooked foodstuffs and in the region of its other end outlet means for discharge from the body of cooked foodstuffs; worm conveying means mounted within said body and communicating between said inlet and outlet means to disintegrate and pass foodstuffs through the body; means disposed externally of the body intermediate said inlet and outlet means and adapted to cook foodstuff in transit through the body; and throttling means within the body and associated with said outlet means to subject the moving foodstuffs to locally increased pressure whereby juices are exuded therefrom and flow away from the zone of increased pressure along the interior wall of the body counter to the direction of movement of the foodstuffs and hence provide a continuous film between the interior wall of the casing and the moving foodstuffs to prevent carbonization of the latter.

Figure 4:
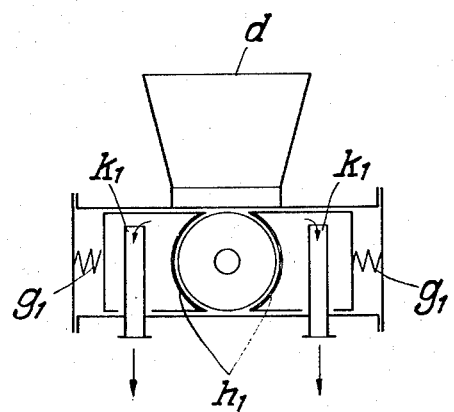
Figure 2:
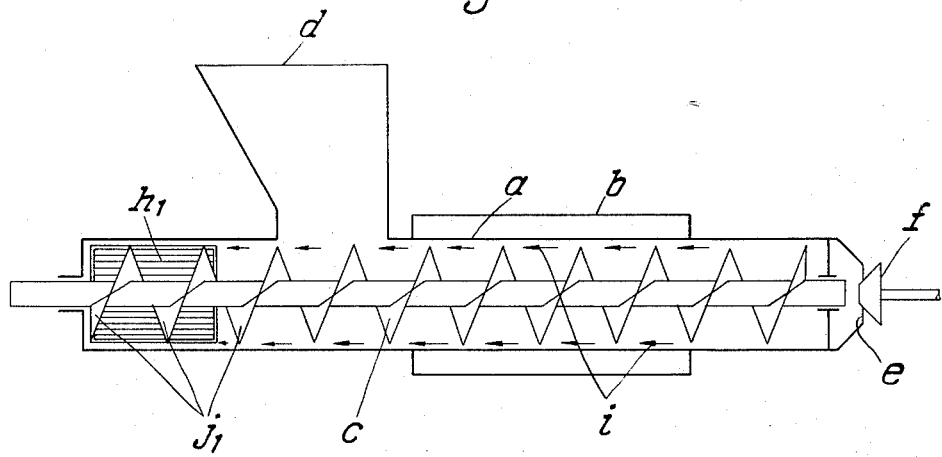
Figure 3:
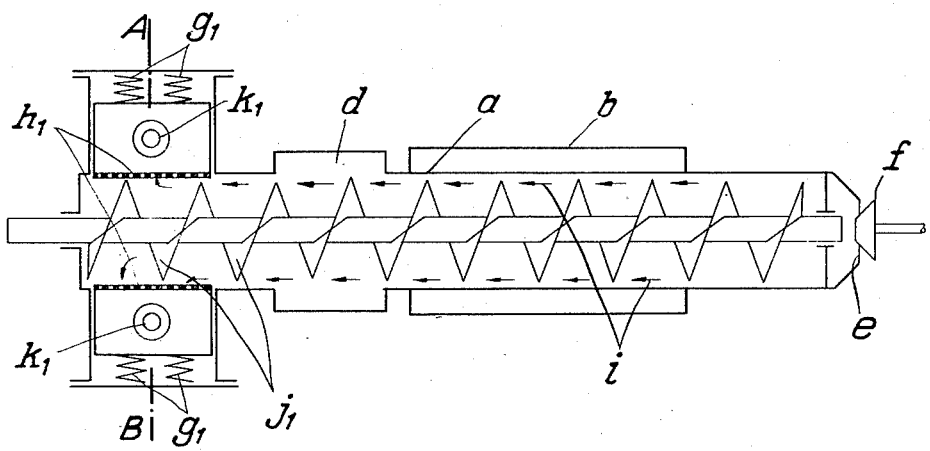

Embodiments of the invention will now be described, simply by way of example, with reference to the accompanying drawings, in which:

Fig. 1 is a diagrammatic longitudinal section of a cooker according to the present invention; and Figs. 2 to 4 are respectively a longitudinal section, a sectional plan view and a section on the line A—B of Fig. 3 of a modified cooker.

Referring to Fig. 1 of the drawings, the cooker comprises an elongated hollow body $a$ enclosed by a heating jacket $b$, a screw or worm conveyor $c$ being rotatably mounted in the body $a$. A chute $d$ receives the foodstuffs to be cooked which are conveyed by the conveyor $c$ to a discharge opening $e$ provided with a longitudinally movable frusto conical throttling member $f$. A floating strainer $h$ mounted by springs $g$ on to the end of the cooker adjacent the chute $d$ forms the forward extremity of the cooker.

The method of operating this cooker consists in feeding the raw juice containing foodstuffs, for example, raw fish, through the chute $d$ into the body $a$ wherein it is received in the turns of the screw conveyor $c$ and is advanced through the cooking zone enclosed by the heating surfaces. As the foodstuff leaves the cooking zone and approaches the discharge opening $e$, it is subjected to locally increased pressure before being finally discharged due to the conveying motion of the screw conveyor $c$ and to the resistance of the throttling member $f$. As a result of this increased pressure in the unheated end region of the cooker the juices of the cooked, disintegrated foodstuffs are exuded therefrom and flow backwards along the heating surfaces in the direction $i$ counter to that of the conveying motion of the screw conveyor $c$. In so doing, the juices form a continuous film between the foodstuff and the heating surfaces of the cooker to prevent carbonization of the former, while still allowing the foodstuffs to be cooked.

Thus, since the counter-flow of released juices is constantly washing the heating surfaces, the thermal capacity of said surfaces is considerably increased. The initial and violent development of steam from the stream of juices very rapidly permeates and disintegrates the moving foodstuffs without giving rise to carbonization thereof. The juices exuded by the cooking process and by the locally increased pressure after moving in the paths designated at $i$ then filters off through the strainer $h$. The level of the juices in the cooker may be regulated by a control device (not shown) in the discharge pipe. The hollow body $a$ has a hollow casing $p$ projecting from the end thereof beneath and beyond the inlet means constituted by chute $d$. The driving means $o$ for the conveyor $c$ extends through the hollow casing $p$. The strainer plate $h$ located adjacent the chute $d$ within the projection $p$ is displacable and is continuously pressed by means of the springs $g$ which are compressed between the end wall of the projection $p$ and the side of strainer plate $h$ against the edge $j$ of the adjacent turn of the conveyor $c$, which turn, as it rotates, continuously scrapes and cleans the surface of the strainer $h$.

It is desirable to provide means for regulating the rotary speed of the screw conveyor.

Referring now to Figs. 2 to 4 of the drawings, the cooker again comprises an elongated hollow body $a$ provided with a heating jacket $b$. A screw conveyor $c$ which conveys the foodstuffs into a chute $d$ through the cooking zone enclosed by the jacket $b$ is arranged within the body $a$. On leaving the cooking zone the foodstuffs are subjected to locally increased pressure due to the conveying motion of the conveyor $c$ and to the compression of a longitudinally-movable, frusto conical throttling member $f$ located at a discharge location $e$. As a result of this locally increased pressure the majority of the juices from the disintegrated foodstuffs are exuded, as stated above, and flow back in the direction $i$, whilst the compressed cooked foodstuffs are discharged from the cooker at location $e$ adjacent the throttling member $f$.

The screw conveyor $c$ is extended forwardly of the chute $d$ by several turns $j_1$, which are enclosed by floating or adjustable strainers $h_1$. Springs $g_1$ urge the strainers $h_1$ gently against the turns $j_1$, the juices returning from the cooker being drawn off via the strainers $h_1$ through discharge pipes $k_1$.

The method of operation of this modified cooker is as follows:

The returning juices from the cooked foodstuffs pass through the raw foodstuffs disposed within the turns of the conveyor $c$ located beneath the chute $d$ and into the additional turns $j_1$. The forward pressure of the turns $j_1$ ensures that the raw foodstuffs lying within the area of the chute $d$ do not reach the strainers $h_1$. At the same time the strainers $h_1$ pressed by the spring $g_1$ against the turns $j_1$ are continuously scraped and cleaned to ensure that, even after lengthy periods of operation, the strainers $h_1$ are not choked.

The juices flow through the strainers $h_1$ and enter the vertical discharge pipes $k_1$ from whence they are drawn off. The level of the juices in the cooker can be regulated by adjusting the length of the pipes $k_1$ which project freely into the strainer chambers.

A further notable advantage of these discharge pipes is that, where there is a mixture of water and oil, the oil layer floating on the surface of the water can be continuously drawn off separately from the water, thus ensuring that the oil is not allowed to remain too long in the cooker, which is undesirable.

The above described constructions ensure that the efficiency of continuously operating cookers is increased in an advantageous and economical manner. Experiments have shown that the quantity of released juices returning through the cooker may amount to as much as ⅔ of the total juice capable of extraction from the foodstuffs to be cooked.

The thermal capacity of the heating surfaces of the cooker may be increased to such a degree that cookers, according to the present invention, may be heated very successfully by directly employed combustion gases without carbonization of the foodstuffs conveyed therethrough.

While we have described our invention in certain of its preferred embodiments we realize that modifications may be made and we desire that it be understood that no limitations upon our invention are intended other than may be imposed by the scope of the appended claim.

We claim:

A continuously-operating cooker comprising a cooker body, a worm rotatably arranged in the cooker body, said cooker body being substantially horizontal and having in the region of one of its ends, inlet means for the foodstuffs to be cooked, and in the region of its other end an outlet opening which lies higher than the lowest part of the body and is narrowed by an adjustable throttling means, a steam-heating jacket disposed between the inlet means and the said outlet means, a hollow casing projecting from said cooker body beneath said inlet means and beyond the end of said worm driving means connected with said worm and extending through and beyond said hollow casing, a flat strainer plate displaceably mounted in said hollow casing and slidable on said driving means toward the edge of the end turn of said worm and means disposed between the inner wall of said hollow casing and the face of said flat strainer for continuously urging said strainer into contact with the edge of the end turn of said worm and a discharge pipe for juices extending from said hollow casing.

References Cited in the file of this patent

UNITED STATES PATENTS

| | | |
|---|---|---|
| 780,415 | Eavenson | Jan. 17, 1905 |
| 1,725,221 | Steiner | Aug. 20, 1929 |
| 2,086,072 | Fauth et al. | July 6, 1937 |
| 2,105,782 | Fauth | Jan. 8, 1938 |
| 2,246,045 | Hirschberg | June 17, 1941 |